US007493109B2

(12) United States Patent
Munje et al.

(10) Patent No.: US 7,493,109 B2
(45) Date of Patent: Feb. 17, 2009

(54) INTER-PROCESSOR PARAMETER MANAGEMENT IN A MULTIPLE-PROCESSOR WIRELESS MOBILE COMMUNICATION DEVICE OPERATING ON A PROCESSOR SPECIFIC COMMUNICATION NETWORK

(75) Inventors: Arun Munje, Nepean (CA); Ahmed Farhad, Ottawa (CA); Stewart Charles Morris, Kanata (CA); Jorgen S. Nielsen, Calgary (CA); Peiwei Wang, Kanata (CA)

(73) Assignee: Research In Motion Limited, Waterloo, ON (CA)

( * ) Notice: Subject to any disclaimer, the term of this patent is extended or adjusted under 35 U.S.C. 154(b) by 656 days.

(21) Appl. No.: 10/999,940

(22) Filed: Dec. 1, 2004

(65) Prior Publication Data
US 2005/0124331 A1 Jun. 9, 2005

Related U.S. Application Data

(60) Provisional application No. 60/526,322, filed on Dec. 2, 2003.

(51) Int. Cl.
*H04Q 7/20* (2006.01)
(52) U.S. Cl. .................................... 455/418; 455/556.1
(58) Field of Classification Search ........................ None
See application file for complete search history.

(56) References Cited

U.S. PATENT DOCUMENTS

| 5,142,684 | A | 8/1992 | Perry et al. |
| 5,487,181 | A | 1/1996 | Dailey et al. |
| 5,955,867 | A | 9/1999 | Cummings et al. |
| 7,164,904 | B2 * | 1/2007 | Nagy et al. ................. 455/403 |
| 2002/0011937 | A1 | 1/2002 | Tanehaus et al. |
| 2003/0064703 | A1 * | 4/2003 | Toshida ..................... 455/403 |
| 2003/0143973 | A1 | 7/2003 | Nagy et al. |
| 2003/0153354 | A1 * | 8/2003 | Cupps et al. ................ 455/556 |
| 2004/0204050 | A1 * | 10/2004 | Krishnan et al. ......... 455/556.1 |

FOREIGN PATENT DOCUMENTS

| WO | WO99/05766 | 2/1999 |
| WO | WO00/45496 | 8/2000 |
| WO | WO2004/021684 | 3/2004 |

* cited by examiner

Primary Examiner—Erika A Gary
(74) Attorney, Agent, or Firm—Moffat & Co.

(57) ABSTRACT

A method and system of enabling auxiliary functions in a mobile device operable in a wireless network. A first data processor is configured to be operable with a mobile device application, and a second data processor is required for operation with the wireless network. An auxiliary function is configured to interface only with one of the processors. A data communication channel provided between the processors conveys data received by or sent from the mobile device through the wireless network. A message sent by one of the processors to the other through the data communication channel to enable the auxiliary function of the mobile device for the processor with which the auxiliary function is not interfaced.

20 Claims, 7 Drawing Sheets

INTER-PROCESSOR PARAMETER MANAGEMENT IN A MULTIPLE-PROCESSOR WIRELESS MOBILE COMMUNICATION DEVICE OPERATING ON A PROCESSOR SPECIFIC COMMUNICATION NETWORK

CROSSREFERENCE TO RELATED APPLICATION

The present application claims priority from U.S. Provisional Patent Application No. 60/526,322, filed Dec. 2, 2003, the complete drawings and specification of which are incorporated herein by reference

BACKGROUND

1. Technical Field

This application relates to mobile communication techniques in general, and inter-processor parameter management in a multiple-processor wireless mobile communication device operating on a processor specific communication network in particular.

2. Description of the Related Art

In wireless mobile communication devices, referred to herein primarily as "mobile devices", a single processor typically handles all device functionality, including device software applications, data processing, and communication functions, for example. However, in order to operate on some modern wireles communication networks, a mobile device must include a particular processor or type of processor. For example, the iDEN™ communication network developed by Motorola is one such network that requires a particular mobile device processor.

This network specific processor requirement may be met for new mobile devices by developing operating system software and software applications targeted to the network specific required processor. For existing mobile devices for which operating systems and software applications have already been developed based on a different mobile application specific processor however, providing for mobile device operation on such a network while maintaining mobile device functionality can be much more challenging, particularly when proprietary technologies are embodied in both the network specific processor and the mobile application specific processor. One such mobile device functionality that is challenging to maintain is battery charging and battery management.

SUMMARY

According to one aspect of the present application, there is provided a system of enabling auxiliary functions in a mobile device operable in a wireless network, the system comprising: a first data processor configured to be operable with at least one mobile device application; a second data processor of a preselected data processor type required for operation with the wireless network, configured to manage wireless communication operations with respect to the wireless network for the mobile device; at least one auxiliary function configured to be operable with one of the first data processor and the second data processor; and a data communication channel between the first data processor and the second data processor, wherein data that is received by or to be sent from the mobile device through the wireless network is exchanged between the first data processor and the second data processor through the data communication channel, and wherein at least one message is sent by one of the first data processor and the second data processor to the other of the first data processor and the second data processor through the data communication channel to enable the at least one auxiliary function of the mobile device for one of the first data processor and the second data processor.

Other aspects and features of the present application will become apparent to those ordinarily skilled in the art upon review of the following description of specific embodiments of inter-processor function control through parameter management in a multiple-processor wireless mobile communication device operating on a processor specific communication network in conjunction with the accompanying figures.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

Figure 1:
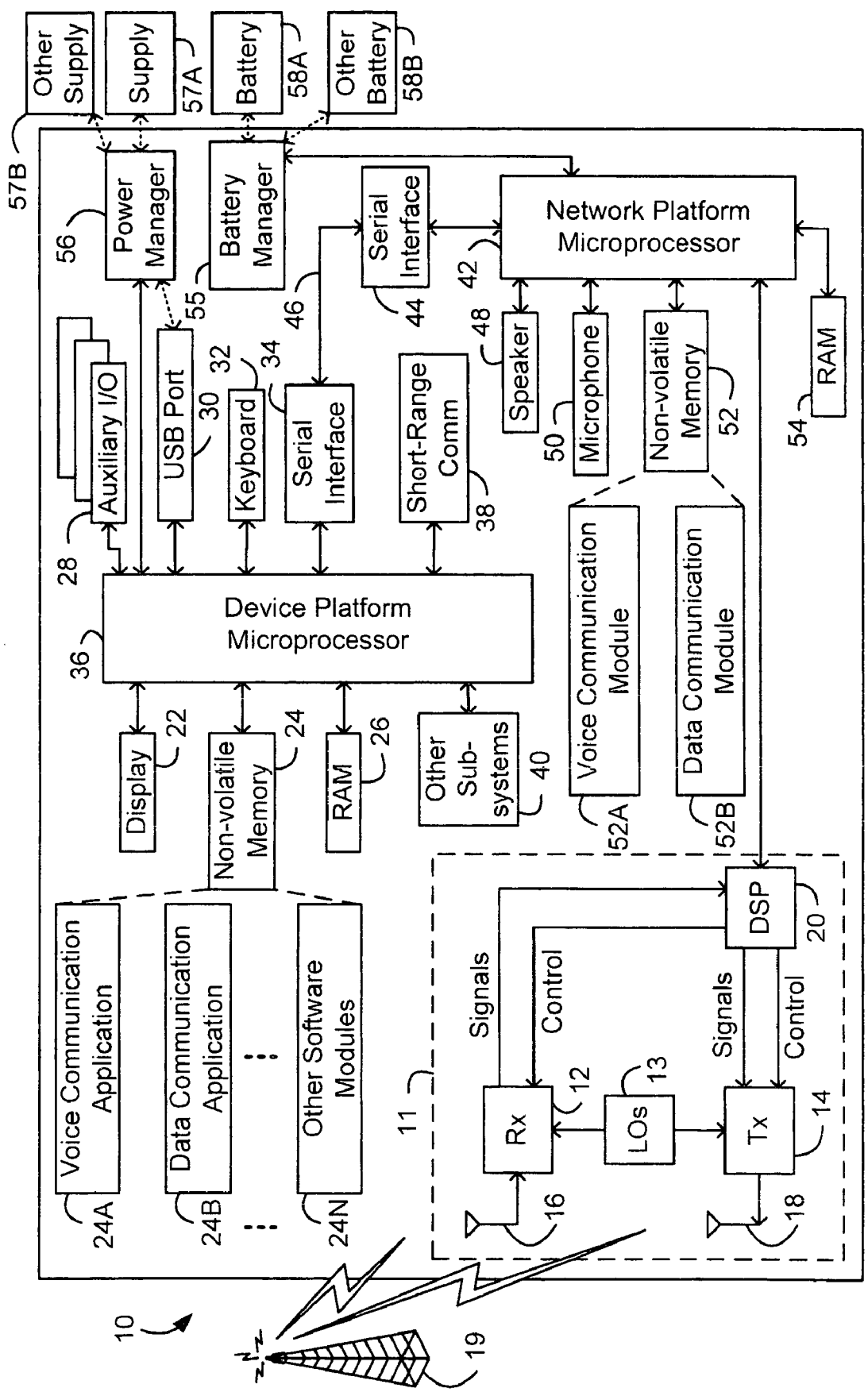
FIG. 1 is a block diagram of a multiple-processor mobile device.

FIG. 1 is a block diagram of a multiple-processor mobile device 10. The mobile device 10 shown in FIG. 1 is a dual-mode device having both data and voice communication functions. However, it should be appreciated that many implementations may be used, such as but not limited to voice-only, data-only or possibly other types of multiple-mode devices, including, for example, cellular telephones, PDAs enabled for wireless communications, one-way and two-way pagers, wireless email devices and wireless modems. The mobile device 10 includes a transceiver 11, a first microprocessor 36, and a second microprocessor 42, as well as components associated with each microprocessor. These components include a display 22, a non-volatile memory 24, a RAM 26, auxiliary input/output (I/O) devices 28, a universal serial bus (USB) port 30, a keyboard 32, a serial interface 34, and a short-range communications subsystem 38 associated with the first microprocessor 36, as well as a serial interface 44, a speaker 48, a microphone 50, a non-volatile memory 52 and a RAM 54 associated with the second microprocessor 42. Such a device also typically includes other device subsystems shown generally at 40. Although the other device subsystems 40 are shown as being associated with the first microprocessor 36, these subsystems may be associated with either, or possibly both, of the microprocessors 36, 42.

In order to meet the network specific processor requirement without having to sacrifice mobile application specific functionality at least two processors are used in the multiple-processor mobile device 10: the network specific processor or network platform processor 42 and the mobile application specific processor or device platform processor 36, which co-operate via some form of inter-processor communication such as via serial interfaces 34 and 44. Thus, mobile device manufacturers can maintain their operating systems and software applications on the mobile application specific processor, while meeting the network specific processor requirement.

The mobile device 10 is preferably a two-way communication device having voice and data communication capabilities. Thus, for example, the mobile device 10 may communicate over a voice network, such as any of the analog or digital cellular networks, and may also or instead communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

The communication subsystem 11 is used to communicate with the wireless network 19, and includes a receiver (Rx) 12, a transmitter (Tx) 14, one or more local oscillators (LOs) 13, and a digital signal processor (DSP) 20. The DSP 20 sends communication signals to the transmitter 14 and receives communication signals from the receiver 12. In addition to processing communication signals, the DSP 20 provides appropriate control of receiver 12 and transmitter 14 using various algorithms and control signals. For example, the gain levels applied to communication signals in the receiver 12 and transmitter 14 may be adaptively controlled through automatic gain control algorithms implemented in the DSP 20. Other transceiver control algorithms could also be implemented in the DSP 20 in order to provide more sophisticated control of the transceiver 11. Although DSP 20 is shown as part of transceiver 11, DSP 20 may be alternatively located in the network platform microprocessor 42.

If device communications through the wireless network 19 occur at a single frequency or a closely-spaced set of frequencies, then a single local oscillator 13 may be used in conjunction with the transmitter 14 and receiver 12. Alternatively, if different frequencies are utilized for voice communications versus data communications or transmission versus reception, then a plurality of local oscillators 13 can be used to generate a plurality of corresponding frequencies. Although two antennas 16 and 18 are depicted in FIG. 1, the mobile device 10 could be used with a single antenna structure. Information, which includes both voice and data information, is communicated to and from the communication module 11 via a link between the DSP 20 and the second microprocessor 42, as will be described in further detail below. The detailed design of the communication subsystem 11, such as frequency band, component selection, power level, etc., will be dependent upon the wireless network 19 in which the mobile device 10 is intended to operate.

After any required network registration or activation procedures, which may also be different for different communication networks, have been completed, the mobile device 10 may then send and receive communication signals, including both voice and data signals, over the wireless network 19. Signals received by the antenna 16 from the wireless network 19 are routed to the receiver 12, which provides for such operations as signal amplification, frequency down conversion, filtering, channel selection, and analog to digital conversion. Analog to digital conversion of a received signal allows more complex communication functions, such as digital demodulation and decoding, to be performed using the DSP 20. In a similar manner, signals to be transmitted to the network 19 are processed, including modulation and encoding, for example, by the DSP 20 and are then provided to the transmitter 14 for digital to analog conversion, frequency up conversion, filtering, amplification and transmission to the wireless network 19 via the antenna 18.

The first microprocessor 36, labelled as a device platform microprocessor but also referred to herein as the first processor, manages primarily non-communication functions of the mobile device 10, whereas the second microprocessor 42, the network platform microprocessor or second processor, manages communications between the mobile device 10 and the wireless network 19. As described above, some wireless networks 19, such as iDEN, are intended to operate only with a particular processor or type of processor. The multiple-processor arrangement shown in FIG. 1 addresses one or more problems associated with adapting a mobile device for operation on a processor-specific communication network, as will be described in further detail below.

Operating system software used by the first processor 36 is preferably stored in a persistent store such as the non-volatile memory 24, which may be implemented, for example, as a Flash memory or battery backed-up RAM. In addition to the operating system, which controls low-level functions of the mobile device 10, the non-volatile memory 24 includes a plurality of high-level software application programs or modules, such as a voice communication software application 24A, a data communication software application 24B, an organizer module (not shown), or any other type of software module 24N. These modules are executed by the first processor 36 and provide a high-level interface between a user of the mobile device 10 and the mobile device 10. This interface typically includes a graphical component provided through the display 22, and an input/output component provided through an auxiliary I/O 28 and/or the keyboard 32. The operating system, specific device software applications or modules, or parts thereof, may be temporarily loaded into a volatile store such as RAM 26 for faster operation. Moreover, received communication signals may also be temporarily stored to RAM 26, before permanently writing them to a file system located in the non-volatile memory 24 for storing data.

An exemplary software module 24N that may be loaded onto the mobile device 10 is a personal information manager (PIM) application providing PDA functionality, such as calendar events, appointments, and task items. This module 24N may also interact with the voice communication software application 24A for managing phone calls, voice mails, etc., and may also interact with the data communication software application for managing e-mail communications and other data transmissions. Alternatively, all of the functionality of the voice communication application 24A and the data communication application 24B may be integrated into the PIM module.

The non-volatile memory 24 preferably provides a file system to facilitate storage of PIM data items on the device. The PIM application preferably includes the ability to send and receive data items, either by itself or in conjunction with the voice and data communication applications 24A, 24B, via the second processor 42 and the wireless network 19. The PIM data items are preferably seamlessly integrated, synchronized and updated, via the wireless network 19, with a corresponding set of data items stored at or associated with a host computer system, thereby creating a mirrored system for data items associated with a particular user.

The mobile device 10 may also be manually synchronized with a host system by placing the mobile device 10 in an interface cradle, which couples the USB port 30 of the mobile device 10 to the USB port of the host system. The USB port 30 may also be used to enable a user to set preferences through an external device or software application, or to download other application modules 24N for installation on the mobile device 10. This wired download path may be used to load an encryption key onto the mobile device 10, which is a more secure method than exchanging encryption information via the wireless network 19. Other types of wired external interface to the mobile device 10, such as a serial port, may also or instead be provided.

Additional application modules 24N may be loaded onto the mobile device 10 through the wireless network 19, through an auxiliary I/O subsystem 28, through the USB port 30, through the short-range communications subsystem 38, or through any other suitable subsystem 40, and installed by a user in the non-volatile memory 24 or RAM 26. The short-range communications subsystem 38 may, for example, be an infrared device and associated circuits and components such as an Infrared Data Association (IrDA) port, or a short-range wireless communication module such as a Bluetooth™ module or an 802.11 module, to provide for communication with similarly-enabled systems and devices. Those skilled in the art to which the present invention pertains will appreciate that "Bluetooth" and "802.11" refer to sets of specifications, available from the Institute of Electrical and Electronics Engineers (IEEE), relating to wireless personal area networks and wireless local area networks, respectively. Such flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The software modules shown at 24A, 24B and 24N represent device functions or software applications that are configured to be executed by the first processor 36. In most known mobile devices, a single processor manages and controls the overall operation of the mobile device as well as all device functions and software applications, including wireless network communications via the transceiver 11. In the mobile device 10 however, the network platform microprocessor 42, hereinafter referred to primarily as the second processor, is provided to manage network communications. The second processor 42 is a processor required for operation on the wireless network 19. Therefore, a multiple-processor mobile device such as 10 is used when a mobile device incorporating functions and applications that are built on one processor or platform is to be adapted for use on a network such as iDEN, which requires a different processor. A mobile device such as 10 allows such adaptation of a mobile device without having to re-develop existing device functions and software applications for the different processor or to emulate the different processor.

Through the serial interfaces 34 and 44 and a serial link 46, the first processor 36 controls the second processor 42 to thereby enable network communication functions for the mobile device 10 on a wireless network 19 on which a device having only the first processor 36 could not normally operate. Communication signals that are received by or to be sent from the mobile device 10 through the transceiver 11 and the wireless network 19 are exchanged between the first processor 36 and second processor 42. Therefore, the mobile device 10 appears to the wireless network 19 to be a network-compatible device, since the required processor (the second processor 42) manages all network communication functions, but may provide enhanced functionality to a user, particularly when the first processor 36 is a more powerful processor than the second processor 42, or when the first processor executes advanced user applications.

The second processor 42 also interfaces with other device components in addition to the transceiver 11. Voice and data communication software modules 52A and 52B, resident in the non-volatile memory 52, provide communication functionality according to network requirements. The RAM 54 is implemented in the mobile device 10 for temporary storage of received communication signals, program data and the like. The speaker 48 and microphone 50 provide inputs and outputs for voice communications. Since the second processor 42 manages network communications, it is most practical to implement the speaker 48 and the microphone 50 to interface with the second processor 42. For an iDEN™ device, for example, those skilled in the art will appreciate that the second processor 42, an iDEN™ processor, has its own set of functions, including voice communications capabilities. Other functions of the second processor 42 could also similarly be retained if needed, such as battery detection and charging. Moreover, a base device with a processor 36 may also have a rich feature set, such that many of the features associated with typical implementations of the second processor 42 would not be required. In some multiple-processor dual-mode devices, the speaker 48 and microphone 50 could be configured for operation with the first processor 36 instead of the second processor 42. Thus, the second processor 42 manages at least communication functions and may optionally provide other functions.

When the mobile device 10 is operating in a data communication mode, a received signal, such as a text message or a web page download, is processed by the transceiver 11 and provided to the second processor 42, which may further process the received signal, possibly store the received signal to the RAM 54 or the non-volatile memory 52, and forward it to the first processor 36 through the serial link 46 and interfaces 44 and 34. Those skilled in the art will appreciate that in packet-based networks, communication signals are broken into one or more packets for transmission. Each received packet in a particular data communication operation is preferably forwarded to the first processor 36 as it is received.

The first processor 36 may then process a received signal or packets for output to the display 22 or alternatively to an auxiliary I/O device 28, and possibly store the received signal or packets or processed versions thereof in the RAM 26 or the non-volatile memory 24. A user of the mobile device 10 may also compose data items, such as email messages, for example, using the keyboard 32, which is preferably a complete alphanumeric keyboard laid out in the QWERTY style, although other styles of complete alphanumeric keyboards such as the known DVORAK or AZERTY style may also be used. User input to the mobile device 10 is preferably further enhanced with the auxiliary I/O devices 28, which may include such input devices as a thumbwheel input device, a touchpad, a variety of switches, a rocker input switch, etc. The composed data items input by the user are then sent to the second processor 42 over the serial link 46 and then transmitted over the wireless network 19 via the transceiver 11. Outgoing communication signals are stored by either the first processor 36 (in the non-volatile memory 24 or the RAM 26), the second processor 42 (in the non-volatile memory 52 or the RAM 54), or possibly both.

When the mobile device 10 is operating in a voice communication mode, its overall operation is substantially similar to the data mode, except that communication signals are processed primarily by the second processor 42. Received signals are output to the speaker 48 and voice signals for transmission are generated using the microphone 50. However, alternative voice or audio I/O subsystems, such as a voice message recording subsystem, may also be implemented on the mobile device 10 and associated with either the first processor 36 or the second processor 42. Although voice or audio signal output is preferably accomplished primarily through the speaker 48, the display 22 may also be used to provide an indication of the identity of a calling party, the duration of a voice call, or other information related to voice calls. For example, the second processor 42 may be configured to detect caller identification information for an incoming call and to send the information to the first processor 36 via the serial link 46. The first processor 36 then processes the caller identification information and displays it on the display 22.

The second processor 42 can provide additional functions, such as the charging and management of battery, as shown in the drawing by battery manager 55. This can present additional challenges when the battery charging and battery management functions utilize proprietary techniques at the second processor 42, such as by using battery manager 55 which detects the presence and type of one of many possible removable batteries and charges the same under control of second processor 42, while the first processor 36 manages the overall state of mobile device 10, and/or detects the presence or absence of one of many possible charging supplies.

Battery manager 55 can accomplish several functions under control of second processor 42. One function carried out by battery manager 55 is battery detection, whereby battery manager 55 differentiates between battery 58A and other battery 58B. Although only one battery would be used by mobile device 10 at any one time, mobile device 10 preferably has a removable battery such that, for example, if battery 58A is being used and is of a higher capacity than battery 58B, or if battery 58A is a different model than other battery 58B, or if battery 58A is from a different supplier than other battery 58B, or if battery 58A is otherwise different to other battery 58B in some material way, then battery manager 55 enables second processor 42 to detect which kind of battery is being used by mobile device 10. It is envisaged that functions of second processor 42 are either integral to the second processor or are provided by the second processor by using sub-processors or functions which are under control of the second processor, such as battery manager 55 capable of detecting and charging one of many removable batteries such as 58A, 58B.

Another function carried out by battery manager 55 is battery charging. However, in mobile device 10, power to charge a battery can come from one of several external supplies such as supply 57A or other supply 57B. Furthermore, in mobile device 10, either or both supplies may be configured to provide power via USB port 30, so that supply 57A can be a "smart" power supply such as a computer that has a USB port and is running a USB driver for mobile device 10, while supply 57B can be a "dumb" supply such as an AC or car adaptor without need of a USB driver, but which may use the physical interface of USB port 30. Each of these various supplies for power to charge a battery may be limited in the current that they can make available. Generally supply 57A and other supply 57B can differ in the amount of power they can provide. For example, in the case of power derived from USB port 30, if supply 57A is a computer having a USB port that is connected with USB port 30, depending on the state of the USB bus, anywhere from 100 mA to 500 mA may be available to mobile device 10 via USB port 30, so that only a fraction of this is available for charging a battery. The detection and differentiation of supply 57A and other supply 58B, as well as how much power is available for charging a battery is the responsibility of the power manager 56, which is under control of first processor 36.

Therefore, in a multi-processor device 10 where second processor 42 contains or controls charging and/or battery measurement circuitry such as battery manager 55 and/or executes or controls the execution of charging and/or battery management methods, and where first processor 36 contains or controls power supply and/or power management circuitry such as power manager 56 and/or executes or controls the execution of power supply and/or power management methods, first processor 36 needs to control and/or receive notification of some of the charging and/or battery lo management parameters, while second processor 42 needs to delegate control and/or provide notification of some of the charging and/or battery management parameters.

The battery management parameters can depend on the type of battery. Some of the battery management parameters may need to be characterized during manufacture or may change once the mobile device is in the field. At manufacture, the battery management parameter values may vary from one batch of devices to another, as one batch may be manufactured using a particular type of battery or components, while another batch of devices may be manufactured using another type of battery or components. In the field, the user of the mobile device may purchase a second higher capacity battery so that other battery 58B may replace battery 58A. Alternatively, in the field the same battery may age such that the value of battery management parameters characterized at manufacture for the battery need to be updated by the first processor 36 to reflect aging or the fact that another battery is being used. Thus the exchange of battery management parameters enables alternate battery types, and of various ages, to be used in mobile device 10, both at manufacture and in the field.

The charging parameters can depend on the mobile device state (radio on, radio off, device off etc. . . . ), as well as the type and state of the specific power supply, either supply 57A or other supply 57B used as to provide charge power for charging the battery. Example types of power supplies are the USB port of a personal computer, an AC adapter, and car adapter. Furthermore, each of these power supplies may operate in various states. For example, depending on the state of a USB port, it may be able to provide anywhere between 100 mA to 500 mA, and only a fraction of this may be available for use to charge a battery. Further still, more than one type of AC and car adapter could be provided, each capable of being used as a power supply, while providing differing currents available for charging. Yet further still, a universal AC adapter when used as charge source 57B may provide differing charge currents depending on which country it operates in, as standard AC voltages and frequencies can differ from one country to another. Power manager 56 takes all of these possibilities into account, as well as the type of battery currently being used by mobile device 10, so as to provide appropriate charging parameters and charge power for battery manager 55 to operate in charging the battery of mobile device 10.

In order to support multiple types of batteries and power supplies, as well as various operational modes of device 10, charging and battery management parameters need to be exchanged between the first processor 36 and second processor 42.

may be used only for test/debug purposes. Some of the information related to charging and battery state monitoring are reported by the second processor without solicitation and do not need to be explicitly requested by first processor 36. However reporting of these monitor parameters can be disabled/enabled by the monitor commands.

The following table summarizes exemplary battery management and charging messages:

| Message (P1-> P2) | Parameters | P2 response type (Solicited/Unsolicited) | Response from P2 |
|---|---|---|---|
| Message 316 to Query Battery ID on initialization | Nil | Solicited/Unsolicited | Indicates battery ID (For unsolicited case P2 on its own may read battery ID at P2 reset power up and may inform P1 using unsolicited msg) |
| Battery Parameters message 320 in response to message 318 | N bytes of hardware specific information (based on HW requirements) | — | Nil |
| Message 322 to get battery voltage level readings from P2 triggered by charger insertion event | Nil | Solicited | Voltage level at request time |
| Message 326 to control maximum charging current for charger attached in response to message 324 | Charging current | — | Nil |
| Message 328 to enable/disable reporting of charging/battery monitoring parameters | Parameters that need to be monitored | Solicited/Unsolicited | Message 330 via which P2 reports charging/battery monitoring parameters |

In accordance with the technique of the present application, the first processor 36 and second processor 42 communicate battery charging and/or battery management parameters over an inter-processor link, such as 46, by using novel battery charging and/or battery management messages.

Advantageously, battery parameter notification is done once the first processor 36 has determined the type of battery 58A, 58B, particularly in the case where battery 58A, 58B is removable. In the absence of these battery parameter values, second processor 42 would be using default battery parameters that are considered safe for a particular battery, but which may not necessarily be safe for battery 58A, 58B.

Further advantageously, depending on the device state (radio on/off, device off), and the type and state of the charge source, first processor 36 determines the charge parameters and communicates the charge parameters that should be used by the charging algorithm for charging the battery 58A, 58B.

Thus, first processor 36 is enabled to control charging and/or battery management techniques embodied in second processor 42, without having to know the proprietary details of the techniques.

Specific examples of charging and/or battery management parameters are given below for an example iDEN™ processor.

Figure 3:
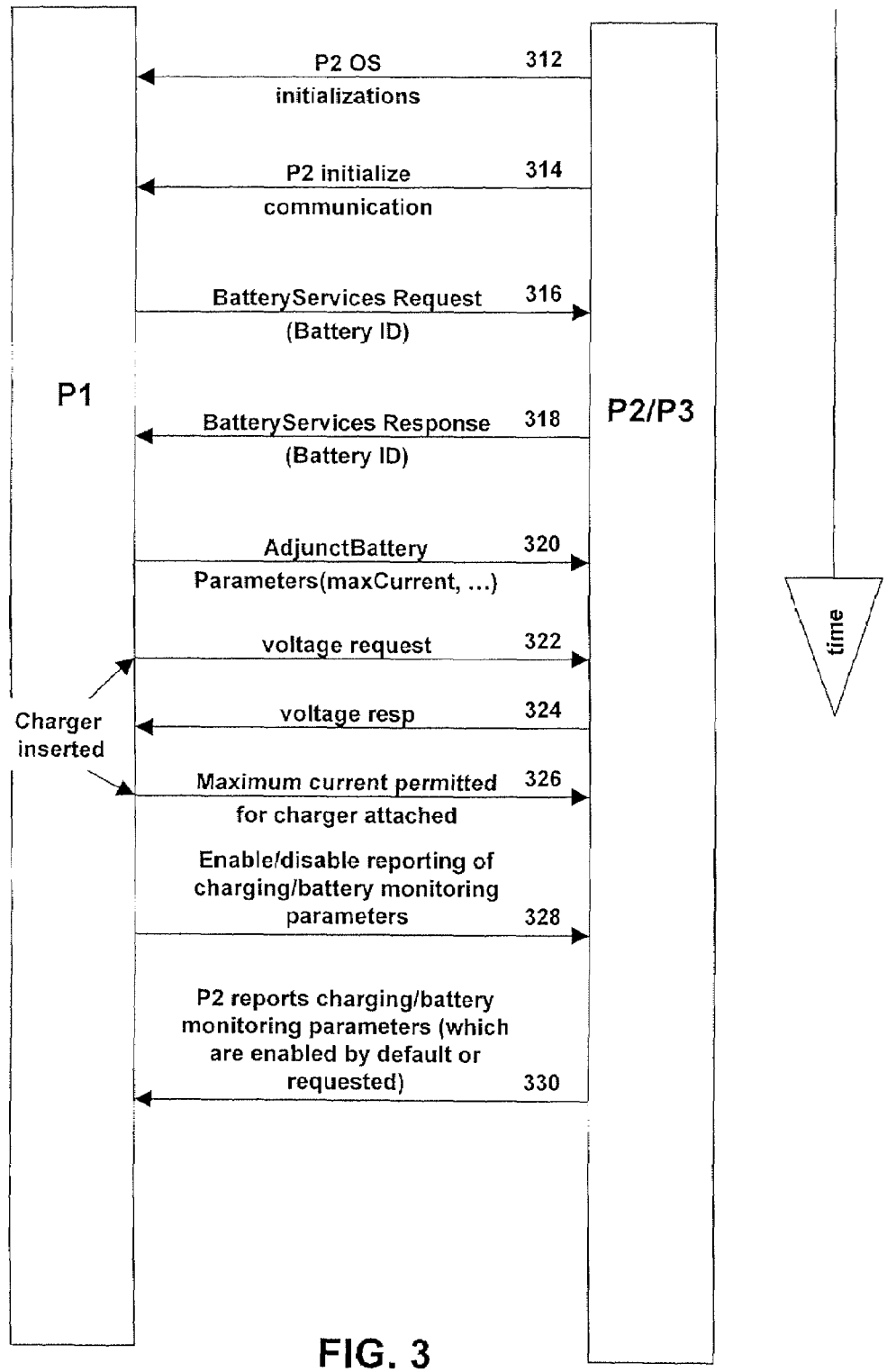
FIG. 3 shows messages exchanged between first and second data processors in accordance with the techniques of the present application in an exemplary multiple-processor mobile device.

If for example second processor 42 is an iDEN™ network processor, second processor 42 will support a number of messages in order to enable first processor 36 to monitor charging as well as battery states. Some of these messages FIG. 3 shows some specific examples of charging and/or battery management RALP messages for an example processor P2 which controls an auxiliary battery manager/charger P3.

Operation of the mobile device 10 will now be described in further detail in the context of an illustrative of example of an iDEN™ mobile device, where the second processor 42 is an iDEN™ processor.

Radio Application Layer Protocol (RALP) is one protocol that may be used to control the iDEN™ radio protocol stack from outside an iDEN™ mobile device, allowing one to turn a device transceiver on and off, begin and end calls, and the like.

There is currently no acceptable way to exchange battery charging and/or management parameters with an iDEN™ processor using RALP. Part of the reason for this is that RALP has primarily been used as a testing protocol, rather than as an integral part of any product's functionality. Applying the technique of the present application to an iDEN™ processor, the first processor and iDEN™ processor communicate battery charging and battery measurement parameters over an inter-processor link by using novel battery charging and battery measurement RALP messages.

Figure 4:
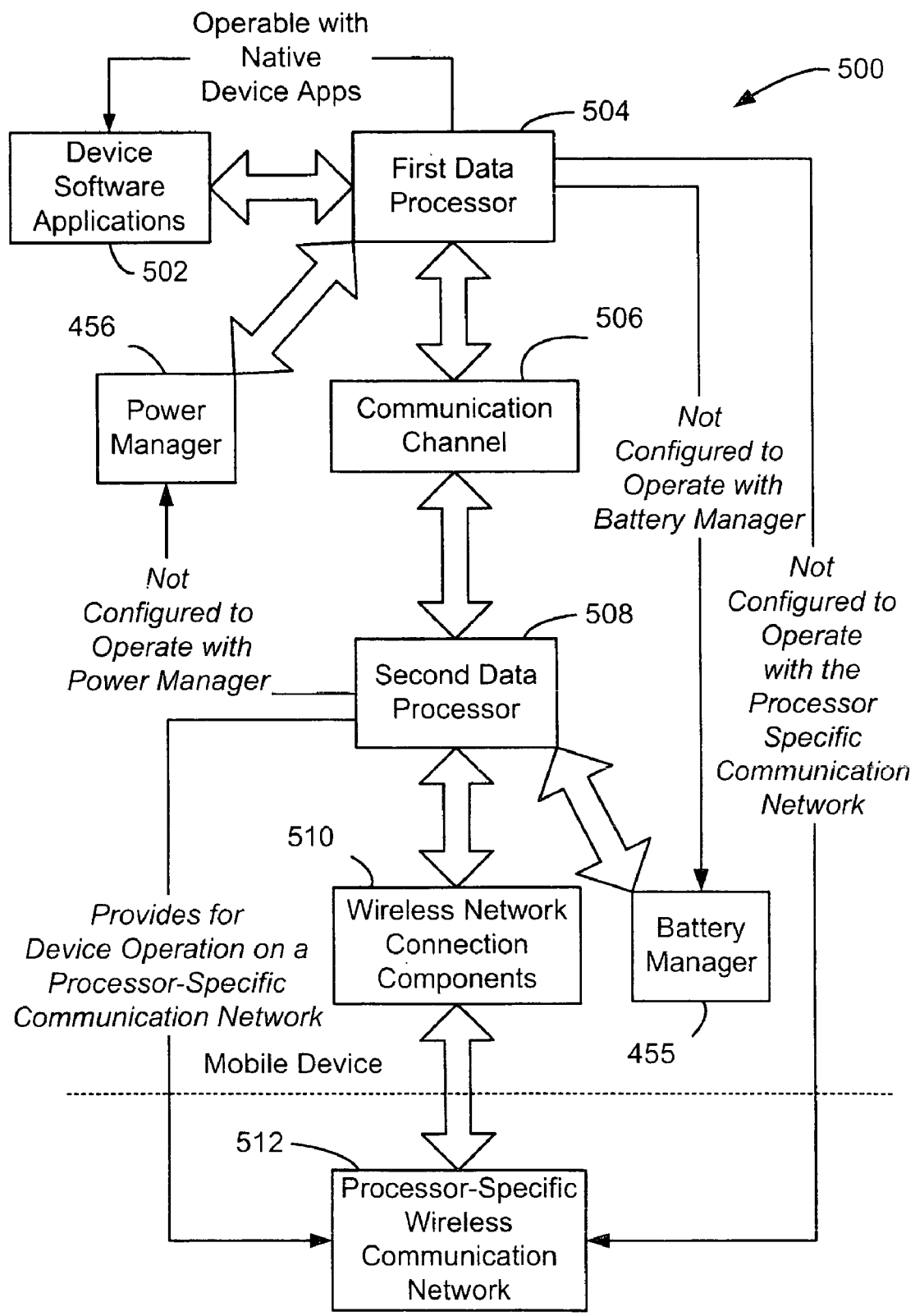
FIGS. 4-7 are block diagrams depicting system-level components of a multiple-processor mobile device provided in accordance with the techniques of the present application.
Figure 5:
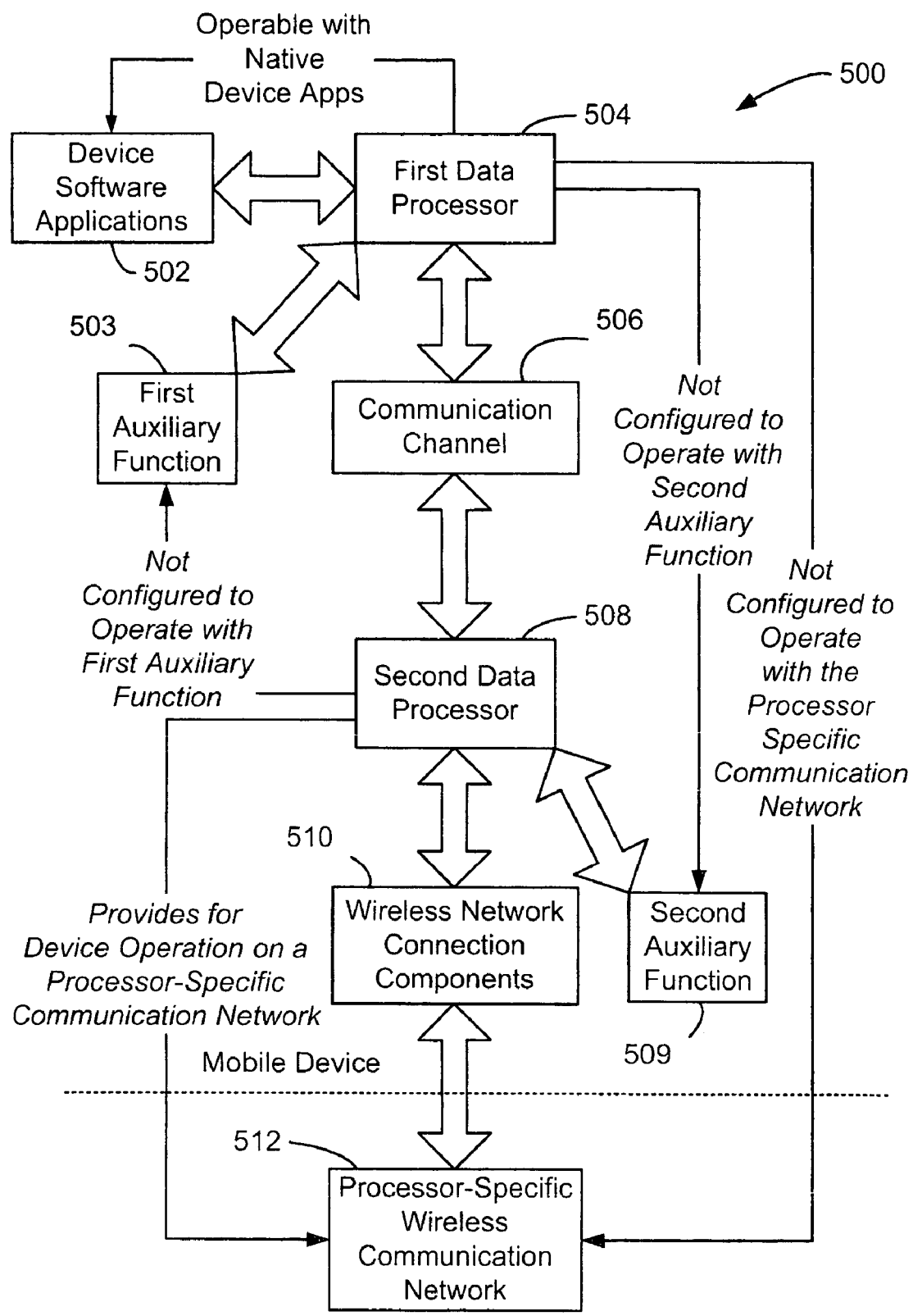

As yet another example of the broad applicability of the systems and methods disclosed herein, FIGS. 4-7 depict components of a multiple-processor mobile device 500. As shown in FIG. 4-5, multiple processors (504 and 508) operate within the mobile device 500, wherein the mobile device 500 is capable of data communications over a wireless network 512.

The first data processor 504 is configured to be operable with at least one native mobile device software application 502, such as a personal information manager application, and is also configured to be operable with at least one first auxiliary function 503, such as power manager 456. The second data processor 508 is configured to process data received from or to be sent over the wireless network 512, and is also configured to be operable with at least a second auxiliary function 509, such as battery manager 455. The first data processor 504 has a configuration such that the first data processor 504 is not operable with the wireless network 512 because the wireless network 512 requires a preselected data processor type, such as the second data processor 508. Furthermore, the first data processor 504 has a configuration such that the first data processor 504 is not operable with the second auxiliary function 509, because the preselected data processor type, such as the second data processor 508, controls second auxiliary function 509. Similarly, the second data processor 508 has a configuration such that the second data processor 508 is not operable with the first auxiliary function 503, because the preferred mobile data processor type, such as the first data processor 504, controls the first auxiliary function 503.

A data communication channel 506 is disposed between the first data processor 504 and the second data processor 508 so that communication data signals that are received by or to be sent from the mobile device 500 through the wireless network 512 are exchanged between the first data processor 504 and second data processor 508 through the data communication channel 506. Such a system allows for device operation on a processor-specific communication network 512 through use of the second data processor 508 while maintaining a native device software platform through use of the first data processor 504, and allows both auxiliary functions 503, 509 under control of first data processor 504 or second data processor 508 to be utilized as features of the mobile device 500. The wireless network connection components 510 include either or both of a receiver and a transmitter compatible with the wireless network 512.

Figure 2:
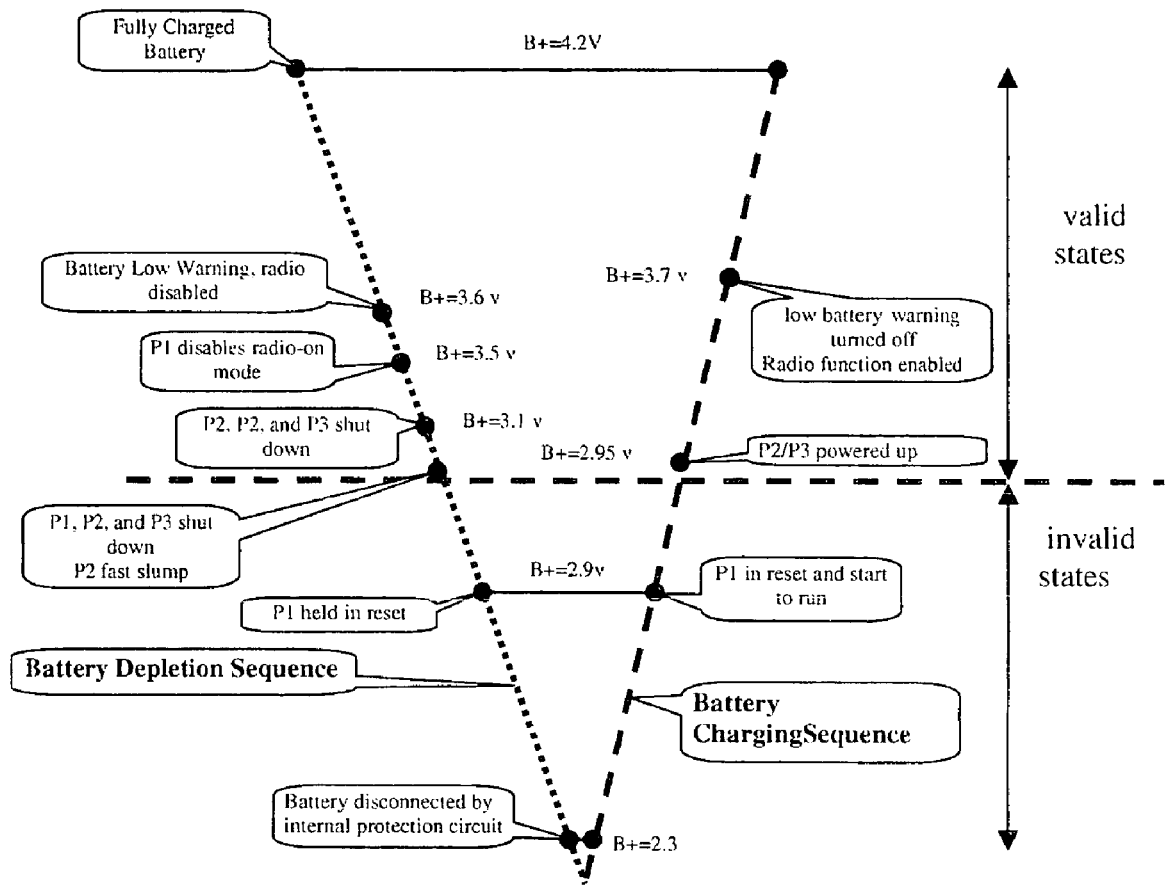
FIG. 2 shows battery voltage thresholds that can trigger battery management and charge management messaging in accordance with the techniques of the present application, in an exemplary multiple-processor mobile device.

With reference to FIG. 2, the diagram shows the different transitions that occur as the battery voltage changes due to charge depletion during use and charge accumulation during charging in an exemplary multi-processor device. The exemplary device has 3 processors, identified as P1, P2 and P3. As an example, P1 can correspond to first processor 36 of FIG. 1, P2 can correspond to second processor 42 of FIG. 1, and P3 can correspond to battery manager 55 of FIG. 1. As shown there are two sets of states. The top half is the valid states which occur for the battery voltage above about 2.95 volts. The lower half is the invalid states which don't normally occur unless the battery is discharged beyond the point where the radio cannot be enabled.

Consider starting from a fully charged battery at 4.2 volts. With UI and radio activity the battery voltage will drop. When B+ reaches battery low warning threshold, which is a nonvolatile item parameter, then a UI warning is displayed. This threshold is set at 3.6 volts at which the Li ion battery is depleted by about 90%. Radio functionality is terminated when battery voltage goes below 3.5V.

If the user continues to use the device without charging then the battery voltage eventually decreases to 3.1 volts at which point the P1 slow slump detector triggers. At this point the P1 orders a shutdown of P2/P3 if they are powered up and then goes into a slow clock mode itself.

Another potential shutdown can come from the P2 fast slump detector, which would trigger prior to the P1 slow slump if the radio is active. This will cause an interrupt to the P2 which turns itself off along with P3. Also a message is sent to P1. P1 may go into slow clock mode at this point. As P1 is not shutdown, there is the option of keeping it in normal mode. Note that the radio-on mode to airplane mode, a mode in which the radio is off, is generally done by the P1 which continually monitors the unloaded battery voltage. However, if the battery is old such that the ESR of the battery is high, then the P2 fast slump will trigger if the loaded voltage drops below 2.95 volts.

The P1 can be powered up as long as the average battery voltage exceeds about 3.1 volts. However the P2/P3 and therefore the radio cannot be enabled unless the voltage is above the threshold when it is safe to turn them on which is 3.7V in the example case.

If the battery voltage is drained below 3.1 volts (mean) then the invalid states are entered. Here, if the user attempts to power up, the device will immediately shut itself off again. Battery drain still occurs due to leakage current of devices directly connected to the battery
P1 operating in slow clock mode
internal battery discharging When the battery voltage reaches 2.9 volts the P1 reset circuitry triggers and the P1 is held in constant reset.

If the battery is still not recharged, it will discharge very slowly until it reaches about 2.3 volts. Here the battery will be disconnected from the outside terminal via a switch internal to the battery itself.

The charger can of course be applied at any time. Note that whenever a valid charger is attached, it powers up the P1, P3 and P2 with P2 in airplane mode (see above). Hence all functionality is restored even though the battery may be completely depleted. However, any attempt to transition the P2 out of airplane mode into an active radio mode is blocked unless the battery voltage exceeds radio turn on threshold, which is 3.7 volts. This is done as any radio activity will require the transmitter to be enabled. The PA requires a minimum voltage of about 2.9 volts to operate without significant distortion. Hence the unloaded battery voltage needs to be higher than about 3.5 volts.

Note that the battery low warning is only extinguished when the voltage exceeds 3.7 volts. The reason for the hysteresis is that the charging current into the battery will raise the battery voltage above its actual level due to the finite ESR. If the radio was disabled when the radio off threshold was reached during the battery depletion, the radio will be automatically enabled when the voltage exceeds 3.7 volts during charging.

The points on the charge curve indicate the capability of the device, should the charger be removed at that point.

Reference is now made to FIG. 3. FIG. 3 shows message exchange between a first and second data processor in accordance with the techniques of the present application. In the example of FIG. 3, the messages exchanged between the processors relate to battery charging. However, as would be appreciated by those skilled in the art, other functions could exist.

When a mobile station is activated, processor P1 comes up first. It then instructions P2 to initialize the hardware and receives a message back from P2 acknowledging that P2 has powered up. This is represented by message 312 in FIG. 3.

Once hardware has been initialized, message 314 is then sent. In message 314, software messaging and communications are initialized and a channel between processor P1 and P2 is established.

In message 316, processor P1 wants to have control over the battery but the battery is handled through processor P2. Therefore, message 316 sends a request to P2 asking for the battery identifier.

A response to message 316 is received in message 318 where battery identifier is passed from P2 back to P1. As will be appreciated by those skilled in the art, steps 316 and 318 are only required if processor P1 does not know what battery is present. If P1 knows which battery is present, messages 316 and 318 do not need to be sent. Similarly, in a more general case, if hardware is being configured through P2 by P1 and P1 already knows about that hardware, a similar message 316 and 318 for that piece of hardware does not need to be sent. Once P1 knows the battery identifier for a battery that is physically controlled by the second processor, P1 can send a message 320. Message 320 allows adjunct battery parameters to be set according to parameters chosen by the first processor.

Steps 312 to 320 comprise the initial sequence of setting parameters for a piece of hardware such as a battery when the device is powered up. If, on power up, it is also detected that a charger is inserted, processor P1 can send a message 322 to P2 requesting the voltage level of the battery. A response 324 is received indicating this voltage level and P1 can then choose, based on the charger and the voltage level, the maximum current permitted for the charger. This is sent as message 326.

As will be appreciated by those skilled in the art, if no charger is attached while the mobile station is powering up, steps 322-326 do not need to be performed during power up. Further, if a charger is inserted after a mobile station is already powered up, steps 322-326 will be performed at that time. Alternatively, if P1 already knows the voltage level due to periodic checks of the voltage level, steps 322 and 324 could be avoided and P1 would only send message 326 based on the charger being inserted and the already known voltage level.

In step 328, the first processor can choose which parameters it wishes to monitor. It can instruct processor P2 to inform P1 when one of the parameters changes. Alternatively, it could instruct processor P2 to send a report periodically. For example, P1 could instruct P2 to report the battery voltage level every two seconds.

In message 330, processor P2 reports to processor P1 based on the parameters set in message 328. Thus, if P1 indicated to P2 it wanted to be told the battery level every two seconds, message 330 will include a battery level report every two seconds. Further, if other parameters are set in 328, these will be reported when the event occurs in message 330.

The above illustrates a series of messages exchanged between a first and second data processor in accordance with the techniques of the present application in an exemplary multi-processor mobile device. FIG. 3, while giving the example of battery configuration and management, could be adapted for other hardware connected through P2 but controlled by P1.

Reference is now made to FIG. 4. FIG. 4 shows a block diagram depicting a mobile device 500 in which a first data processor 504 is adapted to manage a battery through a second data processor 508.

Device application software 502 could be any application software intended for the native device. Device application software 502 is used by first data processor to run the native applications and, in general, would include the applications in FIG. 1 referenced as 24A to 24N.

First data processor 504 further interacts with a power manager 456. Power manager 456 provides a hardware path to a charger. First data processor 504, as illustrated in FIG. 4, is not configured to operate with battery manager functions but must instead communicate through a communications channel 506 to second data processor 508.

As also illustrated in FIG. 4, first data processor 504 is not configured to operate with the processor's specific communications network and this is again left to the second data processor to 508.

In a preferred embodiment, first data processor 504 is equivalent to data platform microprocessor 36 in FIG. 1.

Second data processor 508 communicates with a wireless connection component 510 which then communicate over a radio channel to a processor-specific wireless communication network 512. As illustrated in FIG. 4, second data processor 508 provides for device operation on a processor-specific communication network and this is generally the purpose of second data processor 508. In a preferred embodiment, second data processor 508 is equivalent to network platform microprocessor 42 of FIG. 1.

Second data processor 508 is not configured to operate with power manager 456, as seen in FIG. 4, and communications to power manager must therefore proceed back through communication channel 506 and first processor 504.

A battery manager 455 communicates with second data processor 508. Battery manager 455 manages a battery in the mobile device 500.

When considering FIG. 3 with reference to FIG. 4, if a charger is inserted, power manager 456 will indicate to the first data processor 504 that the charger is inserted. First data processor 504 can then request through second data processor 508 over communications channel 506 the voltage. This is then determined from battery manager 455 and passed back through communications channel 506 to first data processor 504. First data processor 504 can then set the maximum current permitted for the charger that is attached through power manager 456. Other examples would be known to those skilled in the art.

Reference is now made to FIG. 5. FIG. 5 is identical to FIG. 4 with the exception of power manager 456 being replaced by first auxiliary function 503 and battery manager 455 being replaced with second auxiliary function 509. FIG. 5 therefore illustrates a more generic situation in which a first data processor wants to control the second auxiliary function and can get input from a first auxiliary function. In some situations, first auxiliary function may not exist and first data processor 504 is merely used to configure second auxiliary function 509.

For example, in the situation in which first data processor 504 controls audio signal that is generally passed through second data processor 508, first data processor 504 can send configuration messages for this through communications channel 506 to second data processor 508. In the case where a Bluetooth device is connected to mobile station 500, for example, a first auxiliary function may not exist but the second auxiliary function is the audio control for the Bluetooth device. In that case, first data processor 504 can configure the audio function through second data processor 508.

Figure 6:
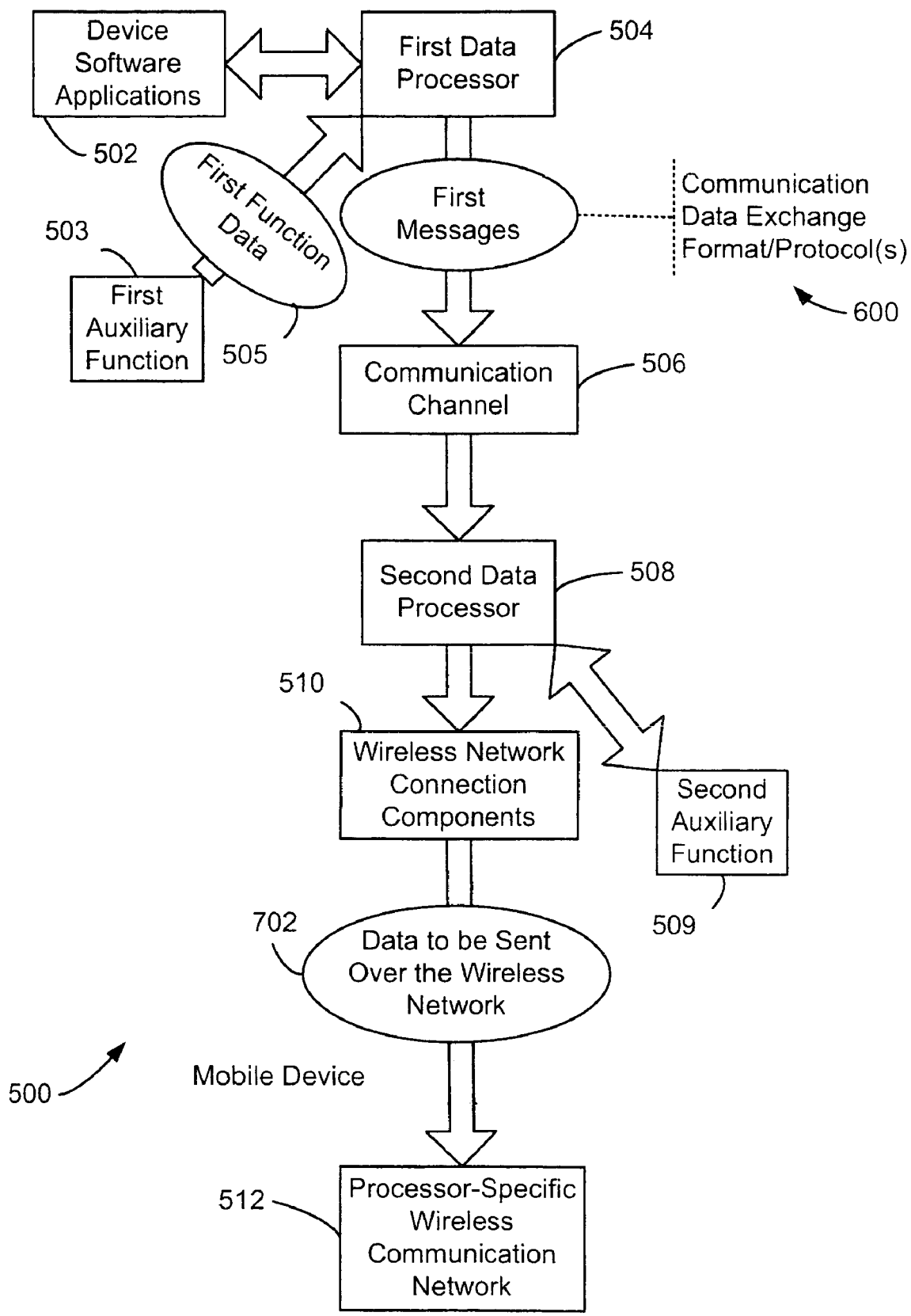

Reference is now made to FIG. 6. FIG. 6 illustrates the setting steps between a first auxiliary function 503, a first data processor 504 and a second auxiliary function 509. First auxiliary function 503 can send first function data 505 to first data processor 504. Examples of first data function could be the amount of current available if first auxiliary function is a power manager. First data processor 504 compiles first function data 505 along with other data received in initializations from second auxiliary function 509 and creates first messages 600. First messages 600 may for example include communications, data exchange and format/protocols These setting parameters are sent through communications channel 506 to second data processor 508 which then sets these functions through second auxiliary function 509 and sends responses back if required.

As with FIGS. 4 and 5, second data processor 508 communicates through a wireless network connection component and sends data 702 that is to be sent over the network to processor-specific wireless communication network 512.

As will be appreciated by those skilled in the art, the messaging of FIG. 6 could be used when mobile device 500 is first powered up or could further be used when something changes within wireless device 500. For example, if a charger or a Bluetooth device is attached, the message passing as illustrated in FIG. 6 could be used.

Figure 7:
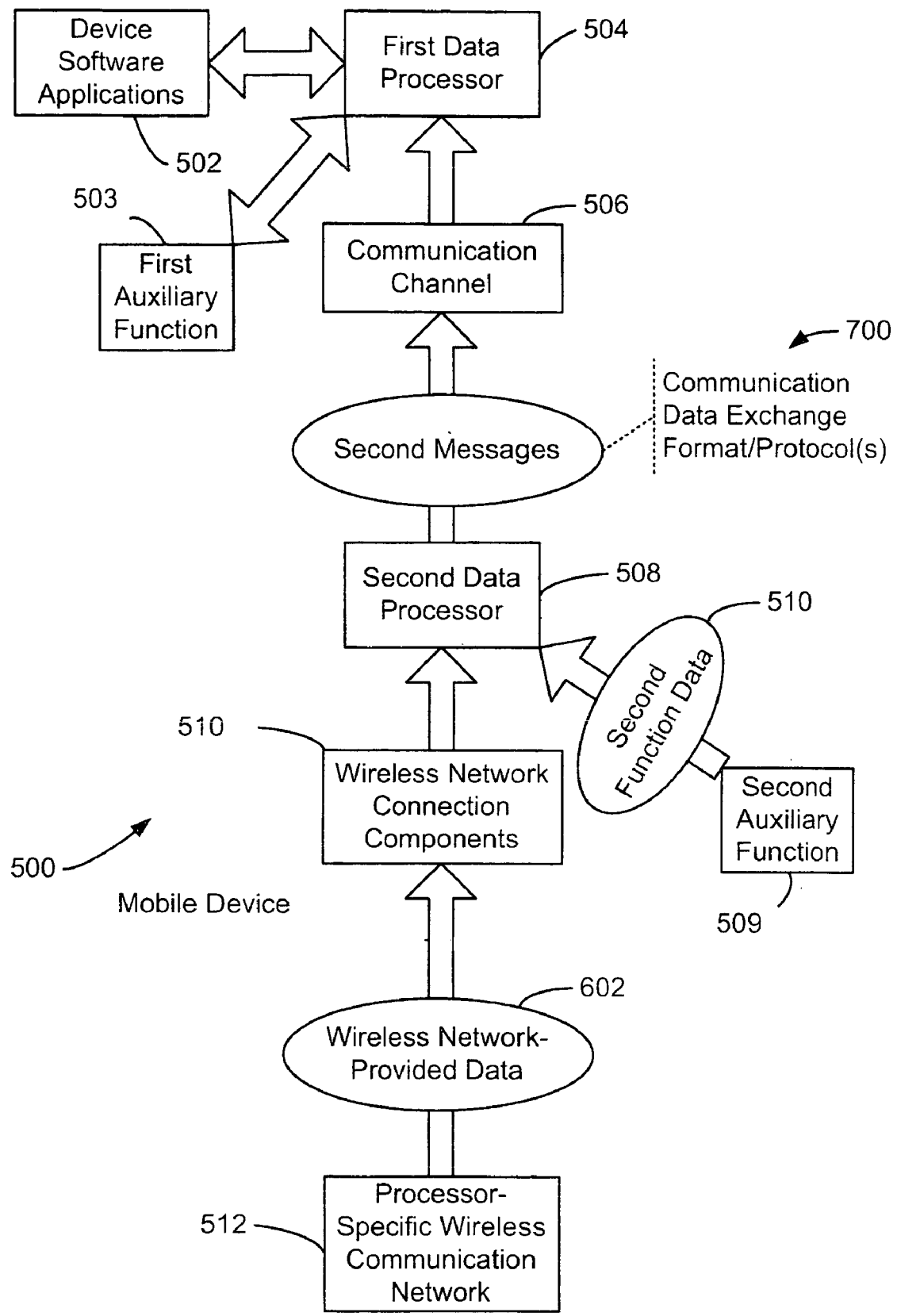

Reference is now made to FIG. 7. FIG. 7 illustrates message passing in a mobile device 500 when any state change information involving second auxiliary function needs to be send back to the first data processor 504. An example of this could be headset plug in where second auxiliary function will be headset detection circuitry. This message passing in FIG. 7 can also occur when second data processor 502 want to send any monitoring information pertaining to second auxiliary function. An example of this could be periodic battery voltage monitoring message from second auxiliary function. Prior to these message passing, the setting steps as illustrated in FIG. 6 have been accomplished, and second data processor 508 has been instructed to report function data from second auxiliary function 509.

Second auxiliary function 509 passes second function data 510 to second data processor 508. Second data processor 508 then composes second messages based on the requirements from first data processor 504 and passes these second messages 700 through communications channel 506 to first data processor 504.

Further, messages or data from the network are passed through processor-specific wireless communication network 512 using wireless network provided data 602 to wireless network connection components 510. Second data processor 508 receives these messages and data and passes them through communications channel 506 to first data processor 504.

As with FIGS. 4, 5, and 6, device software applications 502 communicate through first data processor 504 and first auxiliary functions 503 also connect to first data processor 504.

The above-described embodiments of the present application are intended to be examples only. Those of skill in the art may effect alterations, modifications and variations to the particular embodiments without departing from the scope of the application.

We claim:

1. A system of enabling auxiliary functions in a mobile device operable in a wireless network, the system comprising:
   a first data processor configured to be operable with at least one mobile device application;
   a second data processor of a preselected data processor type required for operation with the wireless network, configured to manage wireless communication operations with respect to the wireless network for the mobile device;
   at least one auxiliary function configured to interface only with one of the first data processor and the second data processor; and
   a data communication channel between the first data processor and the second data processor, the data communication channel conveying between the first data processor and the second data processor:
      data received by or sent from the mobile device through the wireless network, and
      at least one message sent by one of the first data processor and the second data processor to the other of the first data processor and the second data processor to enable control of the at least one auxiliary function of the mobile device for the other one of the first data processor and the second data processor with which the at least one auxiliary function is not interfaced.

2. The system of claim 1, wherein the at least one auxiliary function includes battery management.

3. The system of claim 1, wherein the at least one auxiliary function includes power management.

4. The system of claim 1, wherein the at least one message includes a battery services request message.

5. The system of claim 1, wherein the mobile device has data communication capabilities, and wherein the data received by or to be sent from the mobile device include data communication information.

6. The system of claim 1, wherein the mobile device has voice communication capabilities, and wherein the data which is received by or to be sent from the mobile device include voice communication information.

7. The system of claim 1, wherein the first data processor manages non-network communication functions of the mobile device, and wherein the second data processor manages communications between the mobile device and the wireless network.

8. The system of claim 1, wherein the mobile device provides for device operation on a processor-specific communication network through utilization of the second data processor while maintaining a native device software platform through utilization of the first data processor.

9. The system of claim 1, wherein the first and second data processors have serial interfaces, and wherein the data communication channel comprises a serial link between the serial interfaces of the first and second data processors.

10. The system of claim 1, wherein the data communication channel comprises a shared memory system, and wherein commands written by one of the first data processor and the second data processor into the shared memory system are read out by the other of the first data processor and the second data processor.

11. The system of claim 1, wherein the data communication channel comprises a shared inter-processor bus, in which commands and responses are placed on the bus for communication to either the first data processor or the second data processor.

12. The system of claim 1, wherein the second data processor is configured to detect caller identification information for an incoming call and to send the caller identification information to the first data processor via the data communication channel.

13. The system of claim 1, wherein the first data processor comprises a device platform microprocessor and the second data processor comprises a network platform microprocessor.

14. In a mobile device having a first processor and second processor communicating over a data communications channel and at least one auxiliary function configured to interface only with one of the first processor and the second processor, a method for inter-processor function control comprising:
   exchanging data received by or sent from the mobile device to a wireless network through the data communications channel; and
   enabling control of the at least one auxiliary function at the other one of said first processor and said second processor with which the at least one auxiliary function is not interfaced by sending at least one message from one of the first data processor and the second data processor to the other of the first data processor and the second data processor.

15. The method of claim 14, wherein the at least one auxiliary function includes battery management.

16. The method of claim 14, wherein the at least one auxiliary function includes power management.

17. The method of claim 14, wherein the at least one message includes a battery services request message.

18. The method of claim 14, wherein the mobile device has data communication capabilities, and wherein the data received by or to be sent from the mobile device include data communication information.

19. The method of claim 14, wherein the mobile device has voice communication capabilities, and wherein the data which is received by or to be sent from the mobile device include voice communication information.

20. The method of claim 14, further comprising receiving a data packet transmitted over the wireless network, and wherein exchanging data comprises the second data processor forwarding the received data packet to the first processor through the data communication channel as the data packet is received.

* * * * *